US012794371B2

(12) United States Patent
Jodka et al.

(10) Patent No.: US 12,794,371 B2
(45) Date of Patent: Nov. 10, 2026

(54) CONTROL UNIT AND METHOD FOR OPERATING A POWER CONVERTER IN A BUCK-BOOST MODE

(71) Applicant: Renesas Design (UK) Limited, Bourne End (GB)

(72) Inventors: Eduardas Jodka, Freiburg (DE); Stefan Dietrich, Germering (DE); Gaetano Petrina, Germering (DE)

(73) Assignee: Renesas Design (UK) Limited, Bourne End (GB)

( * ) Notice: Subject to any disclaimer, the term of this patent is extended or adjusted under 35 U.S.C. 154(b) by 178 days.

(21) Appl. No.: 18/747,205

(22) Filed: Jun. 18, 2024

(65) Prior Publication Data

US 2025/0385608 A1 Dec. 18, 2025

(51) Int. Cl.
*H02M 3/158* (2006.01)

(52) U.S. Cl.
CPC .................................. *H02M 3/1582* (2013.01)

(58) Field of Classification Search
CPC .................................................... H02M 3/1582
See application file for complete search history.

(56) References Cited

U.S. PATENT DOCUMENTS

2012/0229110 A1* 9/2012 Huang ................ H02M 3/1582 323/282
2013/0328534 A1* 12/2013 Hsieh .................. H02M 3/1588 323/271
2014/0197811 A1* 7/2014 Qiu ....................... H02M 3/156 323/282
2025/0112556 A1* 4/2025 Bertolini ............. H02M 1/0025

* cited by examiner

*Primary Examiner* — Alex Torres-Rivera
(74) *Attorney, Agent, or Firm* — SCULLY, SCOTT, MURPHY & PRESSER, P.C.

(57) ABSTRACT

A control unit for operating a power converter in a buck-boost mode is provided. The control unit is configured to, within a switching cycle, operate the power converter in an IN state starting from the beginning of the switching cycle until a timer signal of a timer occurs. The control unit is further configured to subsequently operate the power converter in a THROUGH state starting from the timer signal until a peak current event occurs. The control unit is further configured to subsequently operate the power converter in an OUT state starting from the peak current event until a clock signal occurs, which indicates an end of the switching cycle.

19 Claims, 8 Drawing Sheets

CONTROL UNIT AND METHOD FOR OPERATING A POWER CONVERTER IN A BUCK-BOOST MODE

TECHNICAL FIELD

The present document relates to operating a buck-boost power converter in different operation modes. In particular, the present document relates to enabling a buck-boost power converter to transition between operation modes in a stable manner.

BACKGROUND

A portable electronic device uses a rechargeable battery as an unregulated energy source for various different electronic load circuits which typically require a stable regulated voltage source. A switching voltage converter is typically used to convert the unregulated battery voltage of the battery to a regulated output voltage for one or more load circuits.

During the operation of the portable device, the battery voltage drops as the battery is discharged. As a result of this, the battery voltage may be above the regulated output voltage, about the same as the output voltage, or below the output voltage. Therefore, the power converter should be able to operate in a buck mode (for providing a regulated output voltage Vout which is lower than the input voltage Vin), in a buck-boost mode (for providing a regulated output voltage Vout which has a similar level as the input voltage Vin) and in a boost mode (for providing a regulated output voltage Vout which is higher than the input voltage Vin).

The transition between the different operation modes (buck mode, buck-boost mode, boost mode) may lead to overshoots or undershoots of the output voltage.

The present document addresses the technical problem of enabling a power converter for transitioning between different operation modes in a stable manner, notably without incurring overshoots and/or undershoots of the output voltage. The technical problem is solved by each one of the independent claims. Preferred examples are described in the dependent claims.

SUMMARY

According to an aspect, a control unit for operating a power converter in the buck-boost mode is described. The control unit may be configured to, within a switching cycle, operate the power converter in an IN state starting from the beginning of the switching cycle until a timer signal of a timer occurs, wherein in the IN state the input node of the power converter is coupled with the reference node of the power converter via an energy conversion element (notably via an inductor). Furthermore, the control unit may be configured to operate the power converter in a THROUGH state starting from the timer signal until a peak current event occurs, wherein in the THROUGH state the input node of the power converter is coupled with the output node of the power converter via the energy conversion element. In addition, the control unit may be configured to operate the power converter in an OUT state starting from the peak current event until a clock signal occurs, wherein the clock signal indicates the end of the switching cycle, wherein in the OUT state the output node of the power converter is coupled with the reference node of the power converter via the energy conversion element.

According to a further aspect, a control unit for transitioning a power converter between the buck mode and the buck-boost mode is described. The control unit may be configured to detect a peak current event within a switching cycle while the power converter is operated in the buck mode, and upon detecting the peak current event, to start a timer for generating a timer signal. Furthermore, the control unit may be configured to determine whether or not the clock signal for starting a subsequent switching cycle occurs prior to the timer signal, and to operate the power converter in the buck-boost mode within the subsequent switching cycle, if the clock signal occurs prior to the timer signal.

According to another aspect, a control unit for operating a power converter in the boost mode is described. The control unit may be configured to detect a peak current event within a switching cycle, and, upon detecting the peak current event, to start a ramp signal for the detection of a peak current event in a subsequent switching cycle.

According to a further aspect, a control unit for transitioning a power converter between the buck-boost mode and the boost mode is described. The control unit may be configured, within a switching cycle while the power converter is operated in the buck-boost mode, to determine whether or not the clock signal for starting the subsequent switching cycle occurs prior to a peak current event. Furthermore, the control unit may be configured to transition to the boost mode, if the clock signal occurs prior to the peak current event.

According to another aspect, a control unit for transitioning a power converter from the boost mode to the buck-boost mode is described. The control unit is configured, within a switching cycle while the power converter is operated in the boost mode, to start a timer at the beginning of the switching cycle for generating a timer signal, and to detect a peak current event within the switching cycle. Furthermore, the control unit is configured to transition operation of the power converter from the boost mode to the buck-boost mode, if the peak current event occurs prior to the timer signal.

According to another aspect, a method for operating a power converter in the buck-boost mode is described. The method comprises, within a switching cycle, operating the power converter in the IN state starting from the beginning of the switching cycle until a timer signal of a timer occurs. Furthermore, the method comprises operating the power converter in the THROUGH state starting from the timer signal until a peak current event occurs. In addition, the method comprises operating the power converter in the OUT state starting from the peak current event until the clock signal occurs, which indicates the end of the switching cycle.

According to a further aspect, a method for transitioning a power converter between the buck mode and the buck-boost mode is described. The method comprises detecting a peak current event within a switching cycle while the power converter is operated in the buck mode, and, upon detecting the peak current event, starting a timer for generating a timer signal. Furthermore, the method comprises determining whether or not the clock signal for starting a subsequent switching cycle occurs prior to the timer signal, and operating the power converter in the buck-boost mode within the subsequent switching cycle, if the clock signal occurs prior to the timer signal.

According to another aspect, a method for operating a power converter in the boost mode is described. The method comprises detecting a peak current event within a switching cycle, and, upon detecting the peak current event, starting a ramp signal for the detection of a peak current event in a subsequent switching cycle.

According to a further aspect, a method for transitioning a power converter (i.e., for transitioning operation of the power converter) between the buck-boost mode and the boost mode is described. The method comprises, within a switching cycle while the power converter is operated in the buck-boost mode, determining whether or not the clock signal for starting the subsequent switching cycle occurs prior to a peak current event. Furthermore, the method comprises transitioning to the boost mode, if the clock signal occurs prior to the peak current event.

According to another aspect, a method for transitioning a power converter from the boost mode to the buck-boost mode is described. The method comprises, within a switching cycle while the power converter is operated in the boost mode, starting a timer at the beginning of the switching cycle for generating a timer signal, and detecting a peak current event within the switching cycle. Furthermore, the method comprises transitioning (operation of the power converter) from the boost mode to the buck-boost mode, if the peak current event occurs prior to the timer signal.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

BRIEF DESCRIPTION OF THE FIGURES

The disclosure is explained below in an exemplary manner with reference to the accompanying drawings, wherein.

DETAILED DESCRIPTION

Figure 1A:
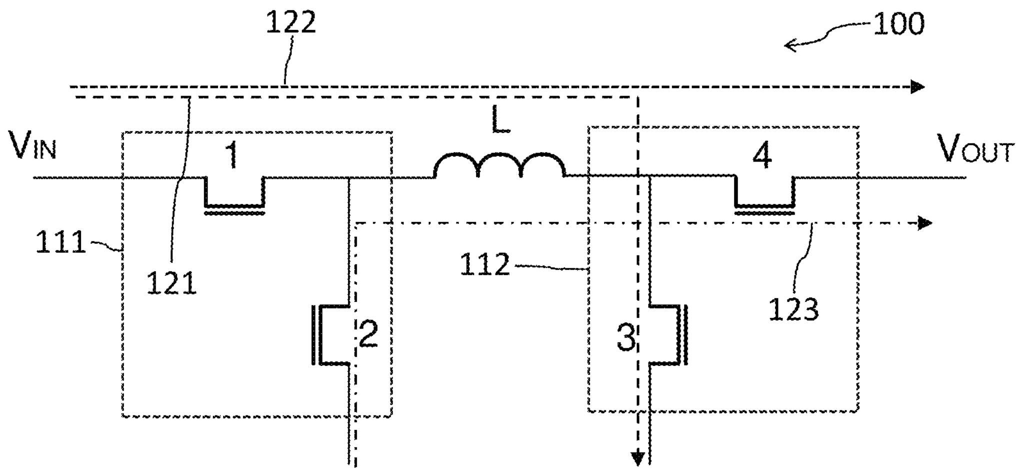
FIG. 1A illustrates an example buck-boost power converter.

As indicated above, the present document addresses the technical problem of enabling a buck-boost power converter to transition between different operation modes, notably the buck mode, the buck-boost mode and the boost mode, in a stable, automatic and smooth manner. In this context FIG. 1A shows an example buck-boost power converter 100 which is configured to convert an input voltage $V_{IN}$ at the input node of the power converter 100 to an output voltage $V_{OUT}$ at an output node of the power converter 100. The power converter 100 comprises:

- a high-side input switch (marked as "1") which is configured to couple the (first node of the) inductor L with or to decouple the (first node of the) inductor L from the input voltage and/or from the input node;
- a low-side input switch (marked as "2") which is configured to couple the (first node of the) inductor L with or to decouple the (first node of the) inductor L from a reference potential (e.g., ground) and/or from a reference node;
- a high-side output switch (marked as "4") which is configured to couple the (second node of the) inductor L with or to decouple the (second node of the) inductor L from the output voltage and/or from the output node; and
- a low-side output switch (marked as "3") which is configured to couple the (second node of the) inductor L with or to decouple the (second node of the) inductor L from the reference potential (e.g., ground) and/or from the reference node.

The high-side input switch and the low-side input switch may be part of an input switch unit 111, and the high-side output switch and the low-side output switch may be part of an output switch unit 112.

The inductor L is an example for a general energy conversion element.

The power converter 100 may be operated repeatedly in a sequence of switching cycles, wherein each switching cycle has a pre-determined cycle duration, wherein the cycle duration may be defined by a clock that is configured to generate clock signals at a certain clock frequency. The cycle duration typically corresponds to the inverse of the clock frequence.

Within each switching cycle, the power converter 100 is operated in one or more different states, typically in two or more different states. Each state exhibits a certain state duration, wherein the sum of the state durations of the different states of a switching cycle is equal to the cycle duration. The state duration of the different states may be varied in order to regulate the output voltage to a pre-determined reference voltage.

For operating the power converter 100 in the buck (operating) mode, each switching cycle may comprise a THROUGH state and an OUT state. In the THROUGH state (which may be referred to as "1+4")

the high-side input switch 1 may be closed;
the high-side output switch 4 may be closed;
the low-side input switch 2 may be open; and
the low-side output switch 3 may be open.

In the OUT state (which may be referred to as "2+4")

the high-side input switch 1 may be open;
the high-side output switch 4 may be closed;
the low-side input switch 2 may be closed; and
the low-side output switch 3 may be open.

For operating the power converter 100 in the buck-boost (operating) mode, each switching cycle may comprise the THROUGH state, the OUT state and an IN state. In the IN state (which may be referred to as "1+3")

the high-side input switch 1 may be closed;
the high-side output switch 4 may be open;
the low-side input switch 2 may be open; and
the low-side output switch 3 may be closed.

For operating the power converter 100 in the boost (operating) mode, each switching cycle may comprise the THROUGH state and the IN state.

Hence, the power converter 100 may be operated in different states, notably in an IN state, in a THROUGH state (which may also be referred to as the BYPASS state) and in an OUT state. FIG. 1A illustrates the current, notably the inductor current, which is associated with the different states, notably,

- the current 121 flowing from the input node (at the input voltage $V_{IN}$) through the high-side input switch 1, through the energy conversion element (notably the inductor L), through the low-side output switch 3 to the reference potential (notably ground), which is associated with the IN state;
- the current 122 flowing from the input node (at the input voltage $V_{IN}$) through the high-side input switch 1, through the energy conversion element (notably the inductor L), through the high-side output switch 4 to the output node (at the output voltage $V_{OUT}$), which is associated with the THROUGH state; and/or the current 123 flowing from the reference potential (notably ground) through the low-side input switch 2, through the energy conversion element (notably the inductor L), through the high-side output switch 4 to the output node (at the output voltage $V_{OUT}$), which is associated with the OUT state.

Figure 1B:
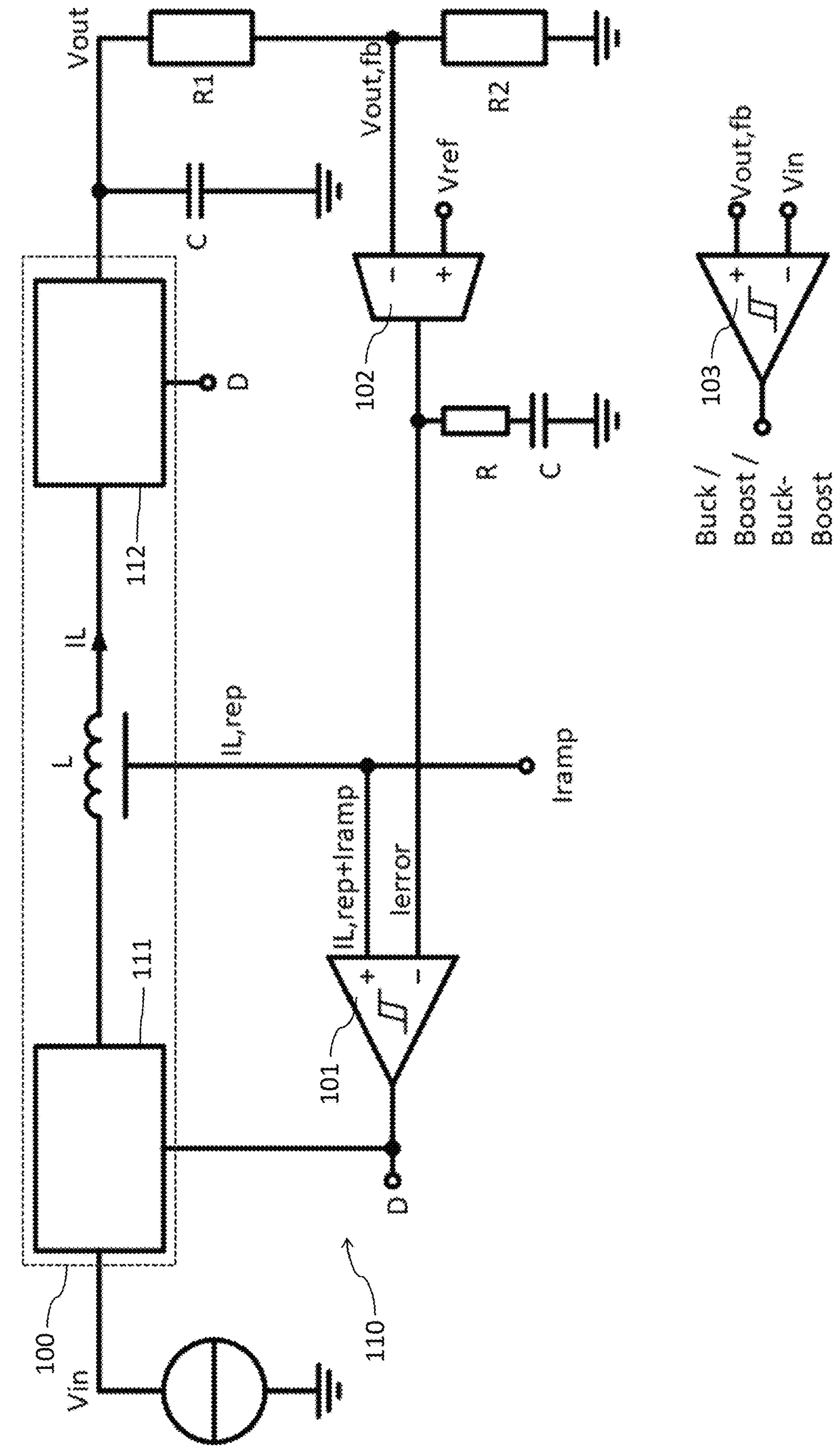
FIG. 1B shows an example regulation scheme for regulating the output voltage of a power converter.

FIG. 1B shows an example regulation circuit 110 for regulating the output voltage at the output node of the power converter 100. The regulation circuit is configured to regulate the output voltage $V_{OUT}$ to a pre-determined level (which is proportional to a reference voltage $V_{ref}$). For this purpose, a feedback voltage $V_{OUT,fb}$ which is proportional to the output voltage $V_{OUT}$ is compared to the reference voltage $V_{ref}$ within the error amplifier 102, which is configured to generate the error signal Ierror.

Furthermore, the regulation circuit 110 is configured to sense the inductor current IL through the inductor L. The sensed inductor current IL, rep is superimposed with a ramp signal Iramp, wherein the ramp signal is a saw tooth signal with ramps that are repeated at the clock frequency. The sum of the inductor current and the ramp signal, i.e. IL, rep+Iramp, is compared with the error signal Ierror within the comparator 101 to generate the duty cycle D which is used to set the different state durations of the different states within an operating cycle of the power converter 100. The regulation circuit 110 is referred to herein as the control unit.

The current mode control (CMC), which is illustrated in FIG. 1B, enhances the control loop's transfer function by sampling the current IL of the inductor L current and by incorporating this information into the feedback loop, thus regulating the output voltage in dependence of the inductor current. CMC improves the response time and simplifies loop compensation without degrading circuit performance.

The power-stage of the power converter 100 (i.e., the switches 1, 2, 3, 4) is used to generate a pulse-width modulated Vin signal to charge or to discharge the energy conversion element (i.e., the inductor L). The pulsed voltage leads to a triangular inductor current IL that periodically charges the output capacitor C in order to generate a regulated output voltage Vout (that may support various different load currents).

The CMC loop combines the two system parameters output voltage Vout and inductor current IL. The output voltage sensing Vout,fb is fed back to the system using a resistive voltage divider R1 and R2. It is then compared to the reference voltage Vref to generate the defined output voltage Vout. The comparison is done in an error amplifier 102 that generates the error signal Ierror.

Furthermore, the inductor current IL is measured by a sensing element and replicated into IL,rep. For loop stability, an additional ramp Iramp is added to the replicated inductor current information IL,rep. A PWM comparator 101 compares Ierror to IL,rep+Iramp and generates a duty cycle signal D that is either high or low. The duty cycle signal D is used as pulse-width modulation (PWM) signal in the power-stage to control the respective switches and to generate the pulsed Vin signal that leads to the inductor charge or discharge. The duty cycle D represents the inductor current on-time ton that charges the inductor with respect to the cycle duration Ts of one complete switching cycle. D may be given by $$D = \frac{\text{ton}}{Ts},\ 0 \le D \le 1$$

Since the output voltage Vout integrates the inductor current IL information over time across the output capacitor C, the voltage feedback loop using Vout,fb is relatively slow and adjustments in the error signal Ierror may be visible over a relatively high number of switching cycles. On the other hand, the inductor current loop is relatively fast, since the inductor current IL is regulated on a cycle-by-cycle basis. The regulation of the inductor current IL can be done using a peak-current mode control, a valley-current mode control, an average-current mode control, or any other cycle-by-cycle current regulation scheme. In order to achieve stability in the current regulation loop for duty cycles >50%, an additional ramp is added to ensure that PWM operation is stable.

The example regulation circuit 110 shown in FIG. 1B makes use of currents to represent the control signals Ierror, IL,rep, Iramp. Alternatively, or in addition regulation voltages Verror, VL,rep, Vramp may be used.

For a buck-boost converter that uses the power-stage in three different operation modes, as outlined in the context of FIG. 1A, each operation mode makes use of the same voltage and current feedback circuit shown in FIG. 1B, as well as the same Iramp slope. The voltage conversion ratio M from Vin to generate Vout is calculated differently in each operation mode and is based solely on the duty cycle D. For the three operation modes, the conversion ratios may be formulated as $$M,\ \text{buck} = \frac{Vout}{Vin} = D$$

$$M,\ \text{boost} = \frac{Vout}{Vin} = \frac{1}{1-D}$$

$$M,\ \text{bubo} = \frac{Vout}{Vin} = \frac{D}{1-D}$$

For the control inputs of the PWM comparator 101, the above-mentioned formulas provide a different sensed inductor current IL,rep and/or error signal Ierror, depending on Vin, Vout and the respective duty cycle in each operation mode.

Hence, at the transition boundaries between modes, namely from buck mode to buck-boost mode and from buck-boost mode to boost mode, there may be relatively large deviations of the sensed inductor current IL,rep and/or the error signal Ierror. Deviations of the sensed inductor current IL,rep are typically not an issue for the feedback loop due to the added Iramp and due to the cycle-by-cycle measurement of the inductor current. On the other hand, a discontinuity of the error signal Ierror at the mode boundaries may lead to discontinuities within the operation of the buck-boost converter 100. In particular, relatively large variations (notably undershoots or overshoots) of the output voltage may be caused by the adjustment of the error signal Ierror during a mode transition, because of the relatively slow loop response and the integrating nature of the Ierror loop.

It has been found that there are two issues that may cause perturbations of the inductor current and that may therefore lead to relatively large integrated errors within the output voltage Vout.

In the following description, the inductor current control makes use of a peak current control. Hence, "IL peak" or "Ipeak" are used as an example for a generic reference current IL,rep. As explained above, the reference current which is used for the inductor current control may be a valley-current, an average-current, or any other cycle-by-cycle current measurement. Hence, it should be noted that within the present document, and notably within the claims, the term "peak current event" may be replaced by the term "reference current event". A "reference current event" may be an event when the current through the energy conversion element (notably through the inductor) reaches a pre-determined reference current. Example reference currents are a "peak current" (and a corresponding peak current event) or a "valley current" (and a corresponding valley current event).

An abrupt change in the voltage conversion ratio M may be caused between the different operation modes, because the mode transitions are forced by a voltage comparator 103 and are not automatically triggered by the regulation loop itself. A forced mode transition may lead to a wrong starting point of the error signal Ierror within the new operation mode and may thereby cause the loop to adjust to the new conditions. This may lead to an erroneous inductor current that integrates on Vout over time. Hence, the loop should be enabled to automatically initiate mode transitions.

A further issue are discontinuous Ierror mode boundaries. When there is a mode transition in the converter 100, the loop adjusts the error signal Ierror to the new operation mode in order to regulate to the new voltage conversion ratio. A wrong starting point of the error signal Ierror within the new operation mode leads to a wrong inductor current IL that integrates on the output voltage Vout over time. This issue may be avoided by ensuring that the error signal Ierror and hence the duty cycle of the loop regulation of two operation modes at the mode boundary match.

In the present document, a natural and automatic loop regulation across all different operation modes without the presence of discontinuities of the error signal Ierror at the mode boundaries is enabled. The reduction (in particular the removal) of discontinuities of the error signal Ierror is equivalent to providing an optimized handover of the regulated IL peak current of two adjacent operations modes, such that there is a smooth transition between the two operation modes. Minimizing the error in the IL peak current avoids a wrong inductor current to be integrated over time on the output voltage Vout and thereby avoids a voltage overshoot or undershoot during mode transitions. If the Ierror boundaries of two adjacent operation modes match, the transition between operation modes may be performed automatically by the loop regulation, such that the mode transition is not forced by a voltage comparator.

Figure 2A:
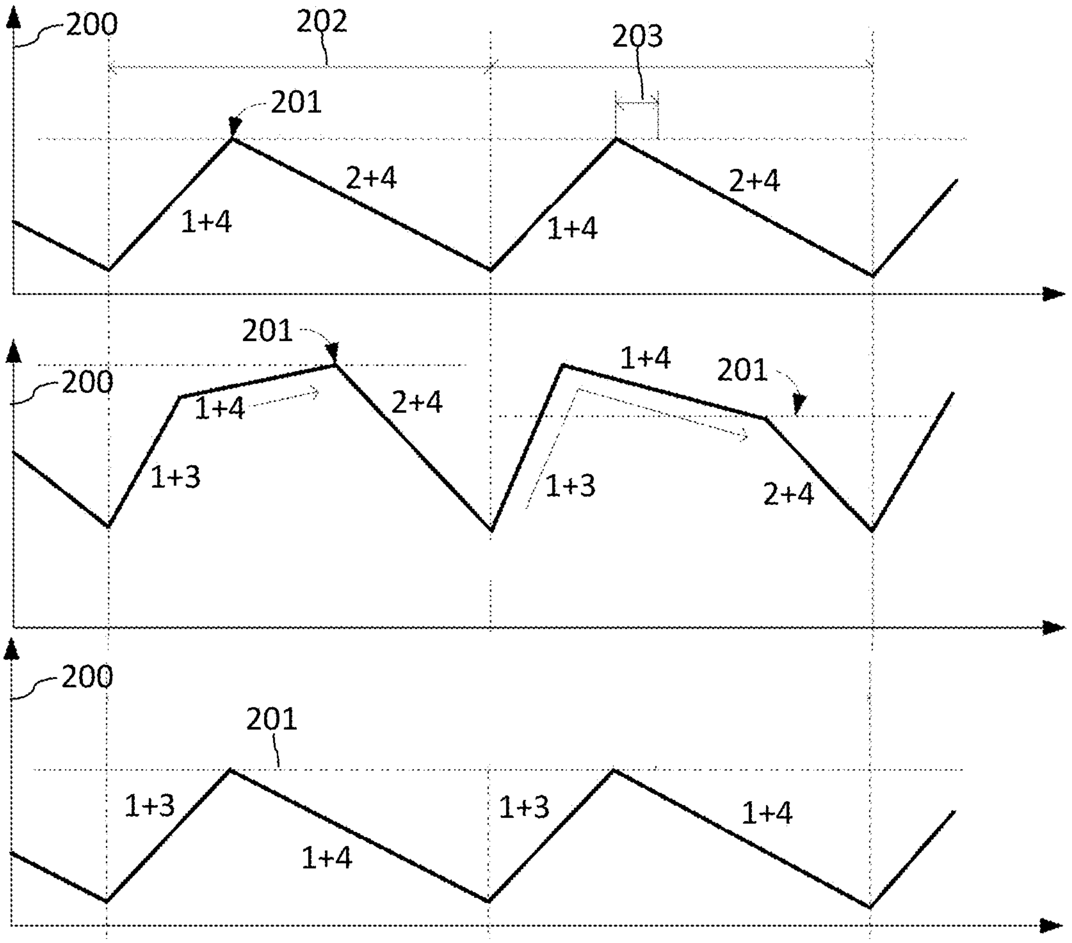
FIGS. 2A-2D show different clock cycles during the operation of a power converter.

FIG. 2A shows the inductor current IL 200 for different operation modes, notably for the buck mode (upper diagram), the buck-boost mode (middle diagram) and the boost mode (lower diagram). Each switching cycle 202 of the buck mode comprises a THROUGH state and a subsequent OUT state. The transition from the THROUGH state is triggered by the inductor current 200 reaching a pre-determined peak current 201.

Each switching cycle 202 of the buck-boost mode comprises an IN state, which is followed by a THROUGH state, which is followed by a subsequent OUT state. The IN state may have a fixed state duration. The transition from the THROUGH state is triggered by the inductor current 200 reaching a pre-determined peak current 201.

Each switching cycle 202 of the boost mode comprises a THROUGH state, which is followed by an IN state. The IN state may have a fixed state duration. The transition between the states may be triggered by the inductor current 200 reaching a pre-determined peak current 201.

Figure 2B:
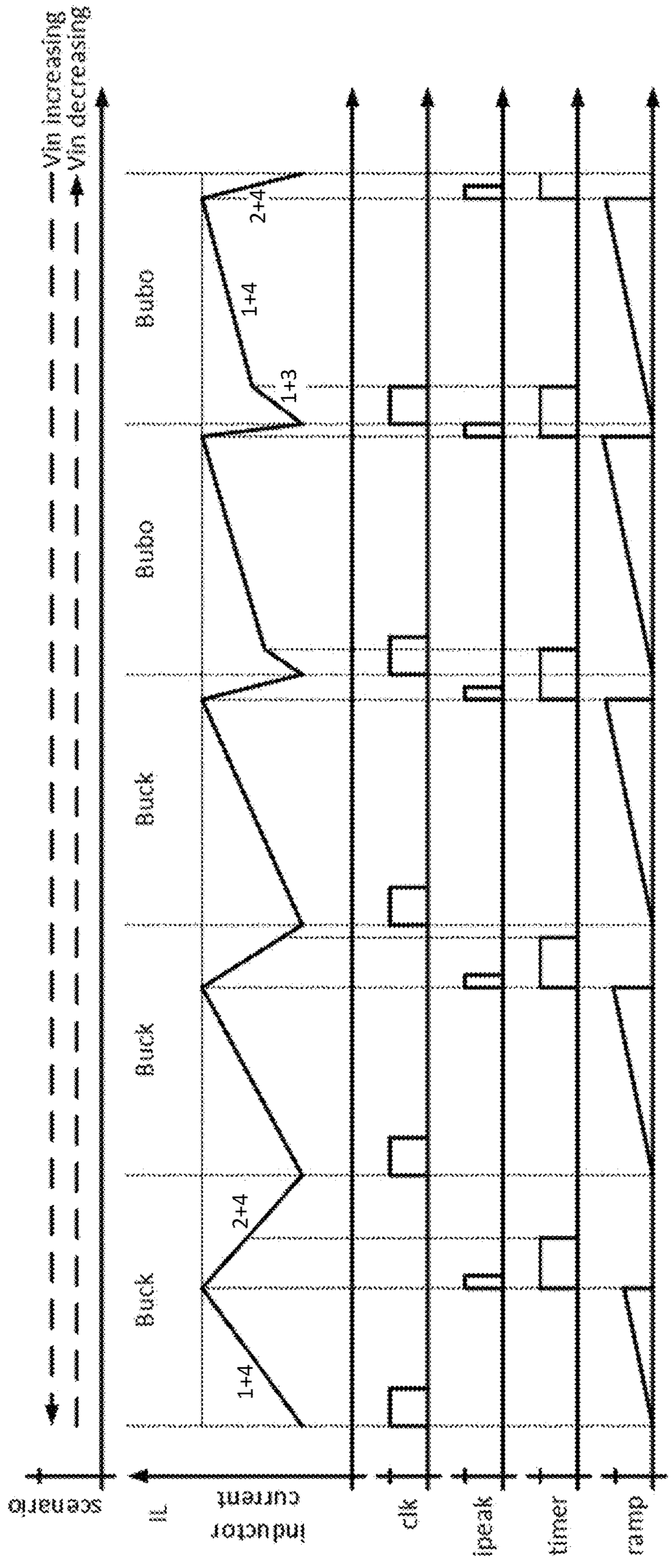

FIG. 2B illustrates a transition from the buck mode to the buck-boost mode. As the conversion ratio M increases from a value smaller than one to a value close to one, the peak current 201 is reached increasingly late (i.e., the peak current event occurs increasingly late) within the switching cycle 202 and the duty cycle D increases.

In order to perform a smooth transition towards the buck-boost mode, the fixed timer 203 for setting the state duration of the IN state of the buck-boost mode may already be triggered within the buck mode. In particular, the timer 203 may be triggered at the peak current event (i.e., at the time instant, at which it is detected that the inductor current IL 200 corresponds to the pre-determined peak current 201). At the end of the switching cycle 202, it may be determined whether the clock signal (for starting the next switching cycle 202) occurs before the timer signal (which indicates the end of the timer 203) or not.

In FIG. 2B, the clock signal corresponds to the beginning of a "clk" pulse. Furthermore, the time signal corresponds to the end of a "timer" pulse. Furthermore, the peak current event corresponds to the beginning of a "ipeak" pulse. FIG. 2B also illustrates the ramp signal "ramp", notably Iramp, which is triggered by the clock signal and which is terminated at the occurrence of a peak current event. The ramp signal is ramped up with a pre-determined slope or gradient.

In view of the fact that the time 203 is started at the peak current event, and in view of the fact that the peak current event increasingly moves towards the end of each switching cycle 202 as the conversion ratio M increases towards one, the timer signal increasingly moves closer towards the end of the switching cycle 202 and eventually occurs subsequently to the clock signal (which triggers the next switching cycle 202).

The power converter 100 may remain within the buck mode as long as the timer signal occurs prior to the clock signal. As soon as the timer signal does not occur prior to the clock signal and/or occurs subsequently to the clock signal, a mode transition from the buck mode towards the buck-boost mode may be performed.

The power converter 100 may be operated within the buck-boost mode such that the fixed timer 203 continues to be started by the peak current event, while on the other hand, the power converter 100 switches into the IN state at the beginning of each switching cycle 202. By consequence, the effective state duration of the IN state corresponds to the fixed time of the timer 203 minus the state duration of the OUT state (at the end of the previous switching cycle 202).

Hence, within the buck-boost mode, each switching cycle 202 comprises:

- the IN state with an effective state duration, wherein the effective state duration is equal to the fixed timer duration of the timer 203 minus the state duration of the OUT state of the directly preceding switching cycle 202; the IN state start at the beginning of each switching cycle 202;
- the THROUGH state with a state duration which is dependent on the occurrence of the peak current event; the THROUGH state directly follows the IN state within each switching cycle 202; and
- an OUT state with a state duration which is also dependent on the occurrence of the peak current event, wherein the OUT state is automatically ended at the end of the switching cycle 202, i.e., at the occurrence of the clock signal; the OUT state directly follows the THROUGH state within each switching cycle 202.

Hence, an automatic transition from the buck mode to the buck-boost mode (scenario "Vin decreasing" in FIG. 2B) may be achieved by monitoring the fixed timer 203 within the buck mode;

by starting the fixed timer 203 at the peak current event; and by triggering the transition from the THROUGH state to the OUT state within the buck-boost mode at the occurrence of a peak current event.

It should be noted that the above-mentioned mechanism also enables an automatic transition from the buck-boost mode to the buck mode (scenario "Vin increasing" in FIG. 2B). As the conversion ratio decreases (from around one to below one), the peak current event moves towards the beginning of the respective switching cycle 202, such that eventually the timer signal occurs prior to the clock signal, thereby triggering the transition from the buck-boost mode to the buck mode.

Figure 2C:
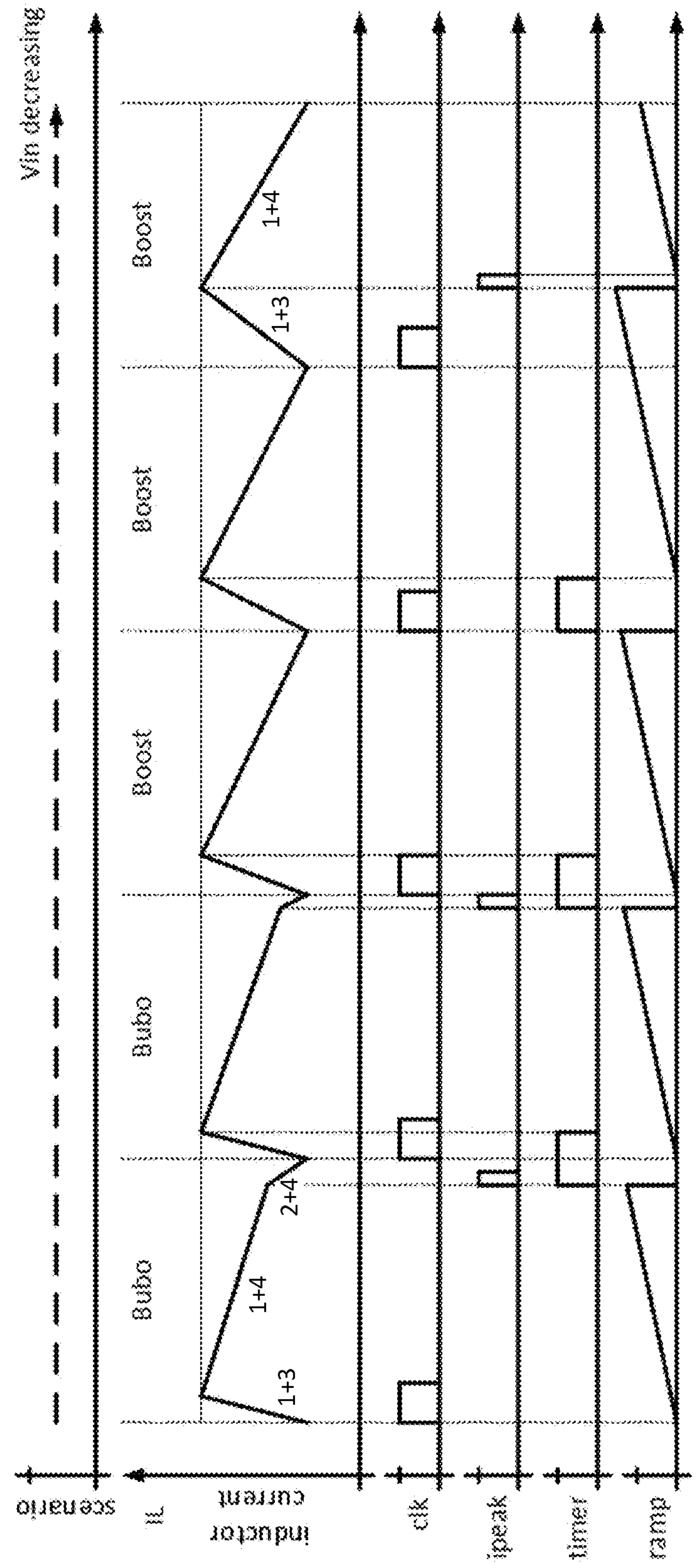

On the other hand, as the conversion ratio continuous to increase above one, the peak current event increasingly moves towards the end of the respective switching cycle 202, as illustrated in FIG. 2C (scenario "Vin decreasing"). It may be verified whether the peak current event occurs prior to the clock signal (which indicates the end of the switching cycle 202 and the beginning of the subsequent switching cycle 202). As long as the peak current signal occurs prior to the clock signal, the power converter 100 may be operated in the buck-boost mode. As soon as the clock signal occurs prior to the peak current event, the transition from the buck-boost mode to the boost mode may be performed. As a result of this, the OUT state is removed from the switching cycles 202.

The boost mode may then start with the IN state which has a state duration that corresponds to the fixed timer duration of the timer 203 (as is also the case within the buck-boost mode). Subsequent to the fixed timer duration of the timer 203 (i.e., upon occurrence of the timer signal), the power converter 100 is switched to the THROUGH state. Furthermore, the power converter 100 remains within the THROUGH state for the remaining duration of the current switching cycle 202.

The transition from the IN state to the THROUGH state triggers the start of the ramp signal. This is in contrast to a conventional boost mode, where typically the clock signal triggers the start of the ramp signal. The ramp signal that has been triggered by the transition from the IN state to the THROUGH state continues to increase at the clock signal (which corresponds to the border between the current switching cycle 202 and the subsequent switching cycle 202). Hence, the ramp signal is not reset by the clock signal, but by the transition from the IN state to the THROUGH state.

The clock signal, i.e., the border between the current switching cycle 202 and the subsequent switching cycle 202, triggers the transition from the THROUGH state to the IN state. Hence, the subsequent switching cycle 202 (which is subsequent to the transition from the buck-boost mode to the boost mode) starts with the IN state. This leads to an increase of the inductor current IL 200 (while the power converter 100 is operated in the IN state). Eventually, a peak current event occurs within the subsequent switching cycle 202, wherein the peak current event triggers a transition from the IN state to the THROUGH state. Furthermore, the peak current event triggers a reset and/or a start of the ramp signal.

FIG. 2C illustrates a first switching cycle 202 during which the power converter 100 is operated within the boost mode, wherein the first switching cycle 202 directly follows a previous switching cycle 202 during which the power converter 100 is operated in the buck-boost (Bubo) mode. The first switching cycle 202 only comprises the IN state followed by the THROUGH state, due to the fact that the peak current event does not occur prior to the clock signal. In view of the fact, that the control unit 110 of the power converter 100 does not know at the beginning of the first switching cycle 202 that the peak current event does not occur prior to the clock signal, the ramp signal is reset and/or started at the clock signal (i.e., at the beginning of the first switching cycle 202).

The actual transition to the boost mode occurs in the second switching cycle 202 which directly follows the first switching cycle 202. As a consequence, the reset and/or the start of the ramp signal is triggered by a transition from the IN state to the THROUGH state. The transition from the IN state to the THROUGH state is caused by the timer signal in the second switching cycle 202. On the other hand, the transition from the IN state to the THROUGH state is caused by a peak current event in the third switching cycle 202 (which directly follows the second switching cycle 202) and in all subsequent switching cycles 202 (while operating the power converter 100 in the boost mode).

Hence, within the boost mode each switching cycle 202 comprises the following sequence of events, start the IN state at the beginning of the switching cycle 202 (i.e., upon occurrence of the clock signal);

start the timer 203 at the beginning of the switching cycle 202;

perform a transition of the IN state to the THROUGH state at the occurrence of a peak current event; and reset and restart the ramp signal at the occurrence of the peak current event.

As the voltage conversion ratio M increases, the peak current event is increasingly pushed towards the end of the respective switching cycle 202. On the other hand, as the conversion ratio M decreases (towards one), the peak current event is gradually moved towards the beginning of the respective switching cycle 202.

In order to enable a smooth transition from the boost mode to the buck-boost mode, the timer 203 is started within the boost mode at the beginning of the IN state, i.e., at the beginning of each switching cycle 202. It is verified whether the timer signal occurs prior to the peak current event or not. As long as the timer signal occurs prior to the peak current event, the power converter 100 remains within the boost mode. On the other hand, as soon as the peak current event occurs prior to the timer signal, the power converter 100 is transitioned from the boost mode to the buck-boost mode. Hence, a smooth transition between the buck-boost mode and the boost mode is enabled.

Figure 2D:
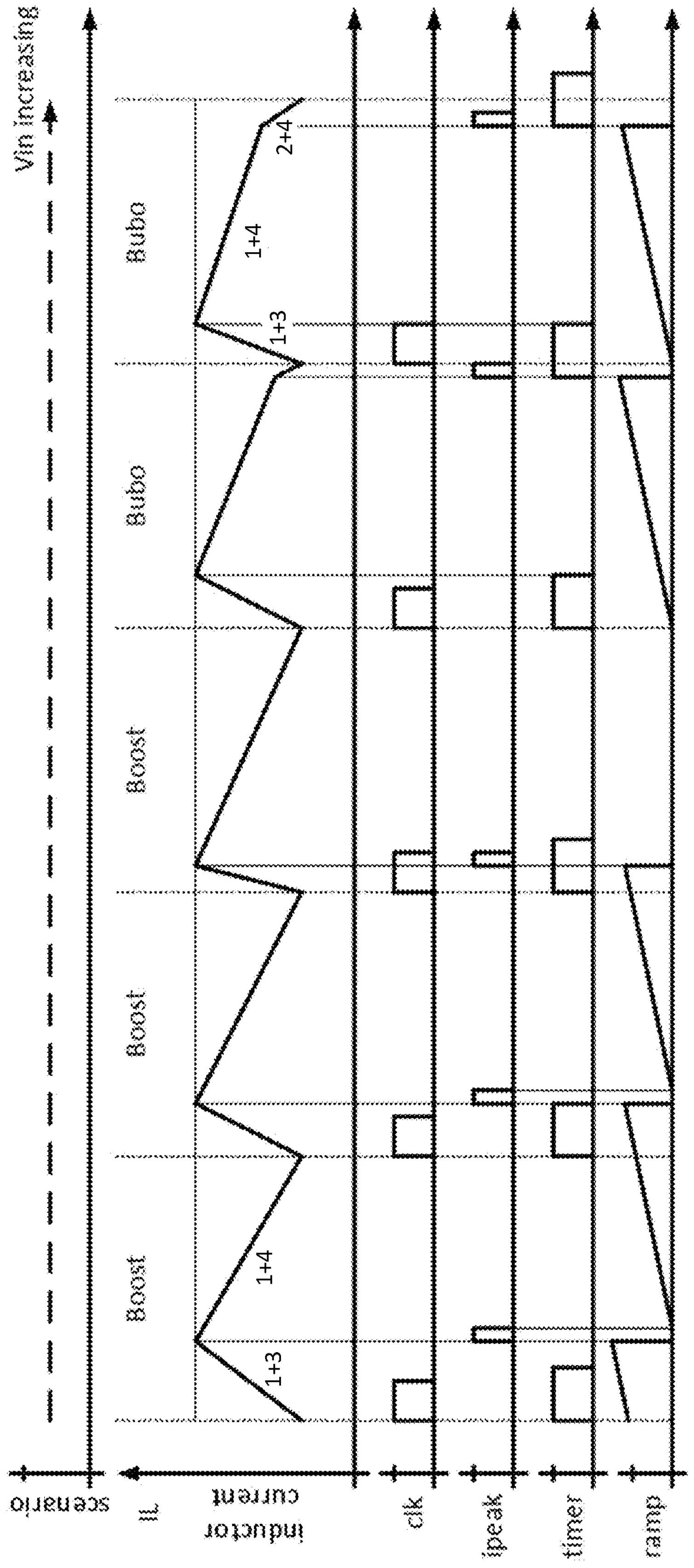

FIG. 2D illustrates a scenario for which the conversion ratio is decreasing (e.g., because Vin is increasing) while the power converter 100 is operated in the boost mode. The power converter 100 is operated within the boost mode, as long as the individual switching cycles 202 each comprise a peak current event, and as long as the peak current event does not occur prior to the timer signal.

If it is detected that the peak current event occurs prior to the timer signal, the restart of the ramp signal is omitted (as shown in the third switching cycle 202 from the left in FIG.

1D). The restart of the ramp is delayed until the beginning of the subsequent switching cycle 202, wherein the power converter 100 is operated in the buck-boost mode within the subsequent switching cycle 202 (as shown in the fourth switching cycle 202 from the left in FIG. 1D).

Figure 3A:
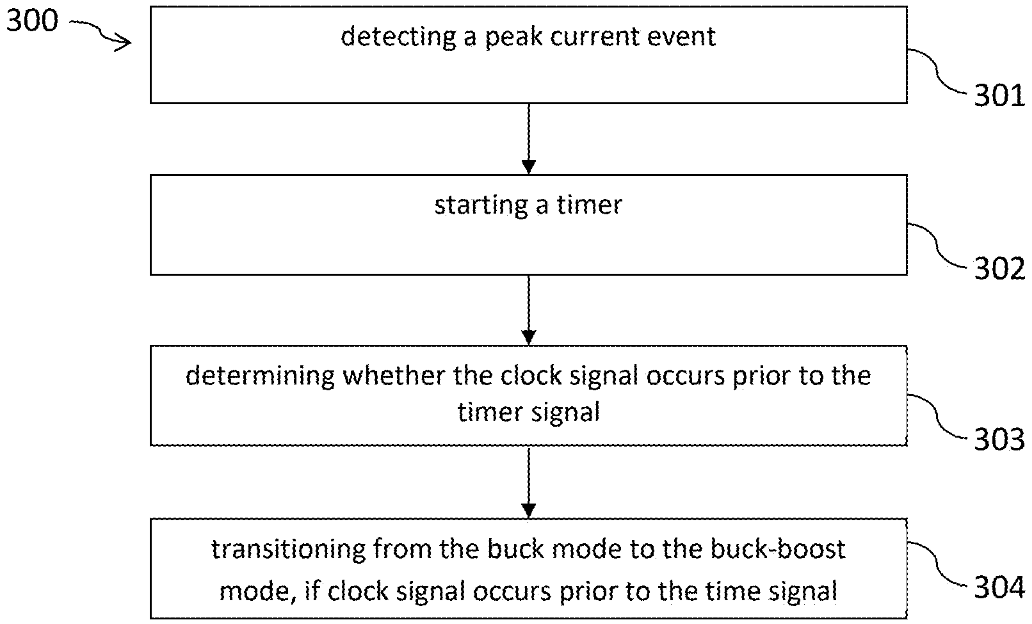
FIGS. 3A-3E show flow charts of different methods for operating a power converter.

FIG. 3A shows a flow chart of an example method 300 for transitioning a power converter 100 between the buck mode and the buck-boost mode. The method 300 may be executed by a control unit 110 of the power converter 100. The method 300 may be executed within a switching cycle 202 (and a directly subsequent switching cycle 202) of a sequence of switching cycles 202. The individual switching cycles 202 may each have a pre-determined (fixed) cycle duration. The power converter 100 and/or the control unit 110 may comprise a clock which is configured to generate clock signals (notably clock pulses) at a pre-determined clock frequency. A clock signal may indicate the end of a switching cycle 202 and the beginning of the directly following switching cycle 202. The cycle duration may correspond to the inverse of the clock frequency.

The method 300 comprises detecting 301 a peak current event within a switching cycle 202, while the power converter 100 is operated in the buck mode. Furthermore, the method 300 comprises, upon detecting 301 the peak current event, starting 302 a timer 203 for generating a timer signal. The timer 203 may have a fixed timer duration. Hence, the timer signal may occur at a time instant which corresponds to the time instant of the peak current event plus the (fixed) timer duration.

The method 300 further comprises determining 303 whether or not the clock signal for starting the (directly) subsequent switching cycle 202 occurs prior to the timer signal. In addition, the method 300 comprises operating 304 the power converter 100 in the buck-boost mode within the (directly) subsequent switching cycle 202, if the clock signal occurs prior to the timer signal. On the other hand, the power converter 100 may be operated in the buck mode within the (directly) subsequent switching cycle 202, if the clock signal does not occur prior to the timer signal.

The method 300 enables a smooth transition between the buck mode and the buck-boost mode (without undershoots or overshoots of the output voltage of the power converter 100).

Figure 3B:
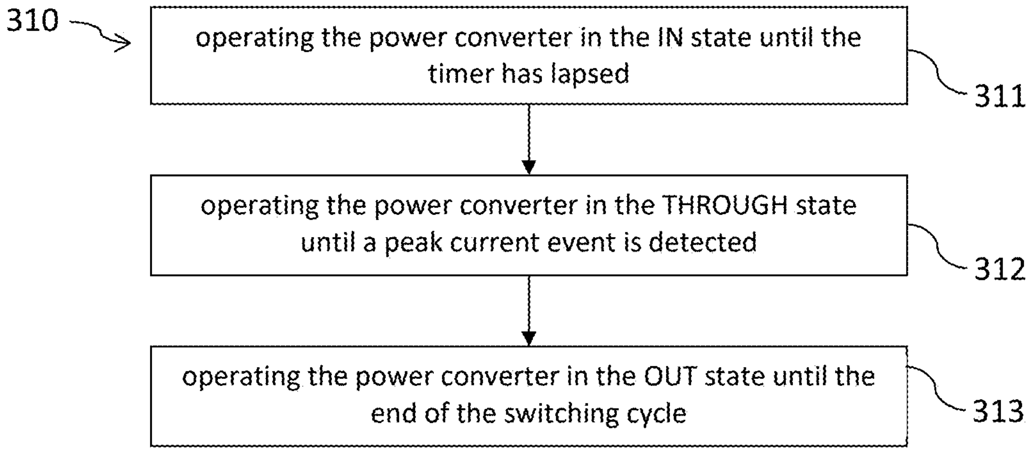

FIG. 3B shows a flow chart of an example method 310 for operating a power converter 100 in the buck-boost mode. The method 310 may be executed by a control unit 110 of the power converter 100. The method 310 comprises, within a switching cycle 202 (notably within each switching cycle 202) of a sequence of switching cycles 202, operating 311 the power converter 100 in the IN state starting from the beginning of the switching cycle 202 until the timer signal of the timer 203 occurs. In the IN state the input node of the power converter 100 may be coupled with the reference node of the power converter 100 via an energy conversion element (notably via an inductor L).

Furthermore, the method 310 comprises operating 312 the power converter 100 in the THROUGH state starting from the timer signal until a peak current event occurs. In the THROUGH state the input node of the power converter 100 may be coupled with the output node of the power converter 100 via the energy conversion element. The timer 203 may be restarted upon occurrence of the peak current event.

In addition, the method 310 comprises operating 312 the power converter 100 in the OUT state starting from the peak current event until the clock signal occurs, which indicates the end of the switching cycle 202. In the OUT state the output node of the power converter 100 may be coupled with the reference node of the power converter 100 via the energy conversion element.

The method 310 enables a smooth transition between the buck mode and the buck-boost mode (without undershoots or overshoots of the output voltage of the power converter 100).

Figure 3C:
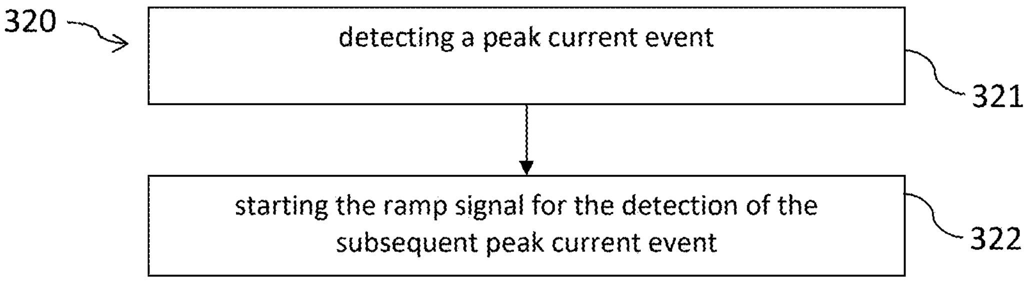

FIG. 3C shows a flow chart of an example method 320 for operating a power converter 100 in the boost mode. The method 320 may be executed by a control unit 110 of the power converter 100. The method 320 comprises (within a switching cycle 202 (notably within each switching cycle 202) of a sequence of switching cycles 202) detecting 321 a peak current event within the respective switching cycle 202. Furthermore, the method 320 comprises, upon detecting 321 the peak current event, starting 322 the ramp signal for the detection of a peak current event in the (directly) subsequent switching cycle 202.

The method 320 enables a smooth transition between the buck-boost mode and the boost mode (without undershoots or overshoots of the output voltage of the power converter 100).

Figure 3D:
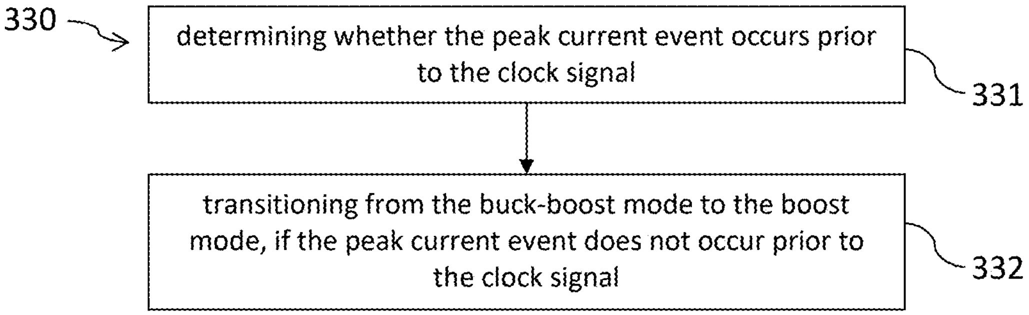

FIG. 3D shows a flow chart of an example method 330 for transitioning a power converter 100 between the buck-boost mode and the boost mode, notably from the buck-boost mode to the boost mode. The method 330 may be executed by a control unit 110 of the power converter 100. The method 330 comprises, within a switching cycle 202 while the power converter 100 is operated in the buck-boost mode, determining 331 whether or not the clock signal for starting the (directly) subsequent switching cycle 202 occurs prior to a peak current event. Furthermore, the method 330 comprises transitioning 332 to the boost mode, if the clock signal occurs prior to the peak current event. On the other hand, the power converter 100 may be maintained within the buck-boost mode, if the clock signal does not occur prior to the peak current event.

The method 330 enables a smooth transition between the buck-boost mode and the boost mode, notably from the buck-boos mode to the boost mode (without undershoots or overshoots of the output voltage of the power converter 100).

Figure 3E:
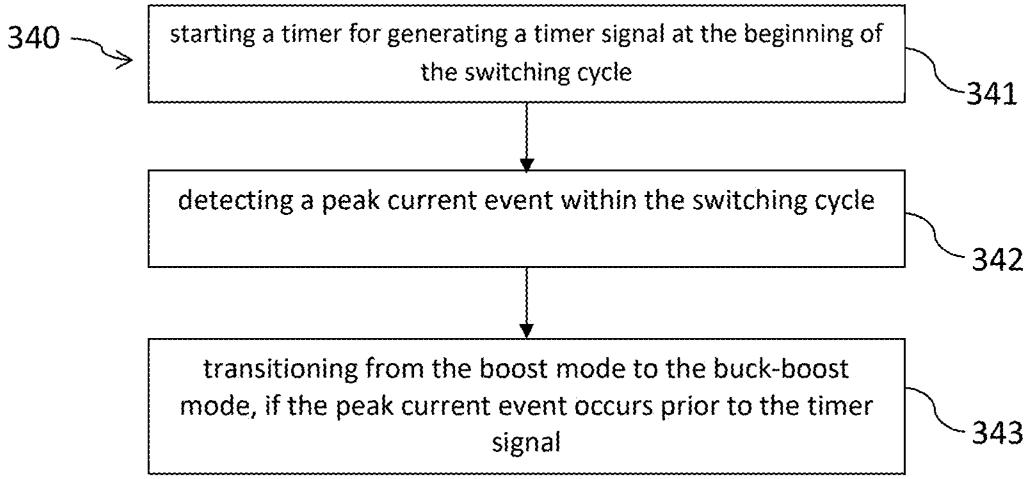

FIG. 3E shows a flow chart of an example method 340 for transitioning a power converter 100 between the buck-boost mode and the boost mode, notably from the boost mode to the buck-boost mode. The method 320 may be executed by a control unit 110 of the power converter 100.

The method 340 comprises, within a switching cycle 202 while the power converter 100 is operated in the boost mode, starting 341 a timer 203 at a beginning of the switching cycle 202 for generating a timer signal, and detecting 342 a peak current event within the switching cycle 202. Furthermore, the method 340 comprises transitioning 344 from the boost mode to the buck-boost mode, if the peak current event occurs prior to the timer signal. As a result of this, the power converter 100 is operated in the buck-boost mode within the subsequent switching cycle 202 (which directly follows the switching cycle 202). On the other hand, if the peak current event does not occur prior to the timer signal, the power converter 100 remains within the boost mode (within the subsequent switching cycle 202).

It should be noted that the methods 300, 310, 320, 330, 340 may be combined (notably for operating a power converter 100 in the different operation modes). Furthermore, the control unit 110 of the power converter 100 may be configured to execute any combination of method steps of the methods 300, 310, 320, 330. In addition, it should be noted that the features which are described in the context of the control unit 110 are also applicable to the respective method 300, 310, 320, 330 (and vice versa).

Hence, a control unit 110 for operating a power converter 100 is described. The control unit 110 may be configured to operate the power converter 100 in the buck mode, in the buck-boost mode and/or in the boost mode. Furthermore, the control unit 110 may be configured to perform transitions between the different operation modes, notably between the buck mode and the buck-boost mode, and/or between the buck-boost mode and the boost mode.

The control unit 110 may be configured to operate the power converter 100 in different switching cycles 202 of a sequence of switching cycles 202. Each switching cycle 202 may correspond to a particular operation mode (i.e., the buck mode, the buck-boost mode or the boost mode). The transition from a first operation mode to another second operation mode may occur at the transition from a first switching cycle 202 (within which the power converter 100 is operated in the first operation mode) to a directly following (i.e. directly subsequent) second switching cycle 202 (within which the power converter 100 is operated in the second operation mode).

Each switching cycle 202 comprises one or more, notably two or more, different states of the power converter 100. Possible states of the power converter 100 may be

- the IN state, within which the input node of the power converter 100 is coupled with the reference node (e.g., ground) of the power converter 100 via an energy conversion element (wherein the energy conversion element may comprise or may be an inductor) (while the output node of the power converter 100 is decoupled from the energy conversion element);
- the THROUGH state, within which the input node of the power converter 100 is coupled with the output node of the power converter 100 via the energy conversion element (while the reference node of the power converter 100 is decoupled from the energy conversion element); and/or
- the OUT state, within which the output node of the power converter 100 is coupled with the reference node of the power converter 100 via the energy conversion element (while the input node of the power converter 100 is decoupled from the energy conversion element).

The power converter 100 may comprise

- a high-side input switch 1 arranged between the input node and a first node of the energy conversion element;
- a low-side input switch 2 arranged between the first node of the energy conversion element and the reference node;
- a low-side output switch 3 arranged between a second node of the energy conversion element and the reference node; and/or
- a high-side output switch 4 arranged between the output node and the second node of the energy conversion element.

The control unit 110 may be configured to

- cause the high-side input switch 1 to be closed, the low-side input switch 2 to be open, the low-side output switch 3 to be open, and the high-side output switch 4 to be closed, for operating the power converter 100 in the THROUGH state; and/or
- cause the high-side input switch 1 to be closed, the low-side input switch 2 to be open, the low-side output switch 3 to be closed, and the high-side output switch 4 to be open, for operating the power converter 100 in the IN state; and/or
- cause the high-side input switch 1 to be open, the low-side input switch 2 to be closed, the low-side output switch 3 to be open, and the high-side output switch 4 to be closed, for operating the power converter 100 in the OUT state.

The buck mode may comprise the THROUGH state and the OUT state. The sum of the state duration of the THROUGH state and the state duration of the (subsequent) OUT state may be equal to the cycle duration. The buck-boost mode may comprise the IN state, the THROUGH state and the OUT state. The sum of the state duration of the IN state, the state duration of the (subsequent) THROUGH state and the state duration of the (subsequent) OUT state may be equal to the cycle duration. The boost state may comprise the IN state and the THROUGH state. The sum of the state duration of the IN state and the state duration of the (subsequent) THROUGH state may be equal to the cycle duration.

The control unit 110 may be configured to, within a switching cycle 202 (when the power converter 100 is operated in the buck-boost mode),

- operate the power converter 100 in the IN state starting from the beginning of the switching cycle 202 until the timer signal of the timer 203 occurs;
- (directly) subsequently operate the power converter 100 in the THROUGH state starting from the timer signal until a peak current event occurs; and
- (directly) subsequently operate the power converter 100 in the OUT state starting from the peak current event until a clock signal occurs, which indicates the end of the switching cycle 202 (and the beginning of the directly subsequent switching cycle 202).

Hence, within the buck-boost mode, the transition from the THROUGH state to the OUT state may be triggered by a peak current event, thereby enabling a flexible and smooth transition to the buck mode and/or to the boost mode.

The control unit 110 may be configured to start the timer 203 for generating the timer signal (directly and/or immediately) upon occurrence of the peak current event. By consequence, the state duration of the IN state within a switching cycle 202 is made dependent on the state duration of the OUT state within the directly preceding switching cycle 202.

In particular, when operating the power converter 100 in the buck-boost mode,

- the THROUGH state may have a state duration which corresponds to the time interval that begins at the occurrence of the timer signal and that ends at the occurrence of the peak current event;
- the OUT state may have a state duration which corresponds to the time interval that begins at the occurrence of the peak current event and that ends at the occurrence of the clock signal which indicates the end of the switching cycle 202; and/or.
- the IN state may have a state duration which corresponds to the fixed timer duration of the timer 203 minus the state duration of the OUT state.

The timer 203 may have a fixed timer duration, such that the timer 203 is configured to generate the timer signal as soon as the fixed timer duration has lapsed. In other words, the timer signal (notably the timer pulse) may be generated at a time instant which follows the time instant at which the timer 203 has been started exactly by the fixed timer duration.

By making the state duration of the IN state dependent on the state duration of the OUT state, a particularly smooth transition between the buck mode and the buck-boost mode is enabled.

The control unit 110 may be configured (within a switching cycle 202 while the power converter 100 is operated in the buck-boost mode) to determine whether or not the timer signal occurs prior to the clock signal (within the respective switching cycle 202). Furthermore, the control unit 110 may be configured to operate the power converter 100 in the buck-boost mode within the (directly) subsequent switching cycle 202, if the timer signal does not occur prior to the clock signal. On the other hand, the control unit 110 may be configured to operate the power converter 100 in the buck mode within the (directly) subsequent switching cycle 202, if the timer signal occurs prior to the clock signal.

Hence, the timer signal may be used for a particularly smooth transition between the buck mode and the buck-boost mode.

The control unit 110 may be configured to, for operating the power converter 100 in the buck mode within a switching cycle 202 (of a sequence of switching cycles 202),

- operate the power converter 100 in the THROUGH state starting from the beginning of the switching cycle 202 until a peak current event occurs (within the respective switching cycle 202); and
- (directly) subsequently operate the power converter 100 in the OUT state starting from the peak current event until the clock signal occurs, which indicates the end of the respective switching cycle 202.

Hence, within the buck mode,

- the state duration of the THROUGH state may correspond to the time interval starting at the beginning of the respective switching cycle 202 and ending at the peak current event; and/or
- the state duration of the OUT state may correspond to the time interval starting at the peak current event and ending at the end of the respective switching cycle 202.

The control unit 110 may be configured to, when operating the power converter 100 in the buck mode, start the timer 203 for generating the timer signal upon occurrence of a peak current event within the respective switching cycle 202. Hence, the timer 203 may be started repeatedly within the individual switching cycles 202, even when the power converter 100 is operated in the buck mode. In particular, the timer 203 may be started at the peak current events within the individual switching cycles 202 (when the power converter 100 is operated in the buck mode). By doing this, a particular smooth transition between the buck mode and the buck-boost mode is enabled.

The control unit 110 may be configured to, when operating the power converter 100 in the buck mode, determine whether or not the timer signal occurs prior to the clock signal which terminates the respective switching cycle 202. This information may be used for determining whether the power converter 100 remains within the buck mode or transitions to the buck-boost mode.

The control unit 110 may be configured to detect a peak current event within a switching cycle 202, while the power converter 100 is operated in the buck mode. Furthermore, the control unit 110 may be configured, upon detecting the peak current event, start the timer 203 for generating a timer signal, and to determine whether or not the clock signal for starting the (directly) subsequent switching cycle 202 occurs prior to the timer signal.

The control unit 110 may be configured to operate the power converter 100 in the buck-boost mode within the (directly) subsequent switching cycle 202, if the clock signal occurs prior to the timer signal. On the other hand, the control unit 110 may be configured to operate the power converter 100 in the buck mode within the (directly) subsequent switching cycle 202, if the clock signal does not occur prior to the timer signal. As a result of this, a particularly smooth transition between the buck mode and the buck-boost mode may be achieved.

The control unit 110 may be configured to (within a switching cycle 202 within which the power converter 100 is operated in the buck-boost mode) determine whether or not the peak current event occurs prior to the clock signal (which triggers the end of the current switching cycle 202 and the beginning of the directly subsequent switching cycle 202).

The control unit 110 may be configured to operate the power converter 100 in the buck-boost mode within the (directly) subsequent switching cycle 202, if the peak current event occurs prior to the clock signal. On the other hand, the control unit 110 may be configured to operate the power converter 100 in the boost mode within the (directly) subsequent switching cycle 202, if the peak current event does not occur prior to the clock signal.

Hence, the time instant of the peak current event and the clock signal may be compared, to perform a smooth transition between the buck-boost mode and the boost mode.

The control unit 110 may be configured, for operating the power converter 100 in the boost mode within a switching cycle 202 (of a sequence of switching cycles 202),

- to operate the power converter 100 in the IN state starting from the beginning of the switching cycle 202 until a peak current event occurs;
- to (directly) subsequently operate the power converter 100 in the THROUGH state starting from the peak current event until the end of the switching cycle 202.

Hence, within the boost mode,

- the state duration of the IN state may correspond to the time interval starting at the beginning of the respective switching cycle 202 and ending at the peak current event; and/or
- the state duration of the THROUGH state may correspond to the time interval starting at the peak current event and ending at the end of the respective switching cycle 202.

The control unit 110 may be configured to, when operating the power converter 100 in the boost mode, start the timer 203 for generating the timer signal at the beginning of (each) switching cycle 202 (of a sequence of switching cycles 202). Hence, the timer 203 may be triggered repeatedly within each switching cycle 202, even when operating the power converter 100 in the boost mode. By doing this, a particular smooth transition between the buck-boost mode and the boost mode is enabled.

The control unit 110 may be configured to determine whether or not the timer signal occurs prior to a peak current event within a switching cycle 202 (when the power converter 100 is operated in the boost mode). This information may be used for determining whether the power converter 100 remains within the boost mode or transitions to the buck-boost mode.

In particular, the control unit 110 may be configured to operate the power converter 100 in the boost mode within the (directly) subsequent switching cycle 202, if the timer signal occurs prior to the peak current event within the switching cycle 202. On the other hand, the control unit 110 may be configured to operate the power converter 100 in the buck-boost mode within the (directly) subsequent switching cycle 202, if the timer signal does not occur prior to the peak current event within the switching cycle 202. By doing this, a particular smooth transition between the buck-boost mode and the boost mode is achieved.

The control unit 110 may be configured (within a switching cycle 202 of the sequence of switching cycles 202) to sense the current through the energy conversion element, to provide a sensed current. The sensed current may be overlayed with a ramp signal to provide a ramped current signal. In particular, the sensed current may be added to the ramp signal to provide the ramped current signal. The ramp signal may start at zero and may be ramped up with a certain slope. The slope of the ramp signal may be dependent on a pre-determined peak current 201 through the energy conversion element. The ramped current signal may be used to detect a peak current event (within the respective switching cycle 202).

The control unit 110 may be configured to determine an error signal based on the output voltage at the output node of the power converter 100 and based on a reference voltage. The ramped current signal may be compared with the error signal to detect a peak current event (within the respective switching cycle 202).

As a result of this, peak current events may be detected in a particularly stable and reliable manner, for enabling a stable operation of the power converter 100.

The control unit 110 may be configured to reset and restart the ramp signal at the beginning of each switching cycle 202, when operating the power converter 100 in the buck-boost mode and/or in the buck mode. On the other hand, the control unit 110 may be configured to resets and restart the ramp signal upon occurrence of a peak current event within each switching cycle 202, when operating the power converter 100 in the boost mode.

Hence, the ramp signal may have a different phase in the boost mode compared to the buck-boost mode and/or the buck mode. By doing this, a particularly smooth transition between the buck-boost mode and the boost mode may be enabled.

Consequently, a control unit 110 for operating the power converter 100 in a boost mode is described, wherein the control unit 110 is configured to detect a peak current event within a switching cycle 202, and, upon detecting the peak current event, to start the ramp signal for the detection of a peak current event in a subsequent switching cycle 202.

The control unit 110 may be configured, for a transition from the buck-boost mode in a first switching cycle 202 to the boost mode in a (directly subsequent) second switching cycle 202, to operate the power converter 100 in the IN state starting from the beginning of the second switching cycle 202 until occurrence of the timer signal, and to operate the power converter 100 in the THROUGH state starting from the occurrence of the timer signal until occurrence of the clock signal which indicates the end of the second switching cycle 202. The ramp signal for the detection of the peak current event in the subsequent switching cycle 202 (directly subsequent to the second switching cycle 202) may be started at the occurrence of the timer signal (within the second switching cycle 202).

In other words, when entering into the boost mode (coming from the buck-boost mode), the transition from the IN state to the THROUGH state may initially be triggered by the time signal. This transition may also trigger the reset and the restart of the ramp signal. For all subsequent switching cycles 202 of the boost mode, the transition from the IN state to the THROUGH state may be triggered by a peak current event. By doing this, a particularly smooth transition from the buck-boost mode to the boost mode may be enabled.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A control unit for operating a power converter in a buck-boost mode, wherein the control unit is configured to, within a switching cycle,
- operate the power converter in an IN state starting from a beginning of the switching cycle until a timer signal of a timer occurs; wherein in the IN state an input node of the power converter is coupled with a reference node of the power converter via an energy conversion element;
- subsequently operate the power converter in a THROUGH state starting from the timer signal until a peak current event occurs; wherein in the THROUGH state the input node of the power converter is coupled with an output node of the power converter via the energy conversion element; and
- subsequently operate the power converter in an OUT state starting from the peak current event until a clock signal occurs, which indicates an end of the switching cycle; wherein in the OUT state the output node of the power converter is coupled with the reference node of the power converter via the energy conversion element, wherein:
  - the THROUGH state has a state duration which corresponds to a time interval that begins at the occurrence of the timer signal and that ends at the occurrence of the peak current event;
  - the OUT state has a state duration which corresponds to the time interval that begins at the occurrence of the peak current event and that ends at the occurrence of the clock signal which indicates the end of the switching cycle; and
  - the IN state has a state duration which corresponds to a fixed timer duration of the timer minus the state duration of the OUT state.

2. The control unit of claim 1, wherein the control unit is further configured to start the timer for generating the timer signal upon occurrence of the peak current event.

3. The control unit of claim 2, wherein the control unit is further configured to:
- determine whether or not the timer signal occurs prior to the clock signal;
- operate the power converter in the buck-boost mode within a subsequent switching cycle, if the timer signal does not occur prior to the clock signal; and
- operate the power converter in a buck mode within the subsequent switching cycle, if the timer signal occurs prior to the clock signal.

4. The control unit of claim 3, wherein the control unit is further configured to, for operating the power converter in the buck mode within the subsequent switching cycle, operate the power converter in the THROUGH state starting from the beginning of the subsequent switching cycle until a peak current event occurs; and subsequently operate the power converter in the OUT state starting from the peak current event until a clock signal occurs, which indicates the end of the subsequent switching cycle.

5. The control unit of claim 4, wherein the control unit is further configured to, when operating the power converter in the buck mode, start the timer for generating the timer signal upon occurrence of a peak current event within a given switching cycle; and determine whether or not the timer signal occurs prior to the clock signal which terminates the given switching cycle, in order to determine whether the power converter remains within the buck mode or transitions back to the buck-boost mode.

6. The control unit of claim 1, wherein the control unit is further configured to:

determine whether or not the peak current event occurs prior to the clock signal;

operate the power converter in the buck-boost mode within a subsequent switching cycle, if the peak current event occurs prior to the clock signal; and operate the power converter in a boost mode within the subsequent switching cycle, if the peak current event does not occur prior to the clock signal.

7. The control unit of claim 6, wherein the control unit is further configured to, for operating the power converter in the boost mode within the subsequent switching cycle, operate the power converter in the IN state starting from the beginning of the subsequent switching cycle until a peak current event occurs; and subsequently operate the power converter in the THROUGH state starting from the peak current event until the end of the subsequent switching cycle.

8. The control unit of claim 7, wherein the control unit is further configured to, when operating the power converter in the boost mode, start the timer for generating the timer signal at the beginning of a given switching cycle; and determine whether or not the timer signal occurs prior to a peak current event within the given switching cycle, in order to determine whether the power converter remains within the boost mode or transitions back to the buck-boost mode.

9. The control unit of claim 7, wherein the control unit is further configured to, when operating the power converter in the boost mode, resets and restart a ramp signal upon occurrence of a peak current event within a given switching cycle.

10. The control unit of claim 1, wherein the timer has a fixed timer duration; and the timer is configured to generate the timer signal as soon as the fixed timer duration has lapsed.

11. The control unit of claim 1, wherein the control unit is further configured to, sense a current through the energy conversion element, to provide a sensed current;

overlay the sensed current with a ramp signal to provide a ramped current signal;

determine an error signal based on an output voltage at the output node of the power converter and based on a reference voltage; and compare the ramped current signal with the error signal to detect a peak current event.

12. The control unit of claim 11, wherein the control unit is further configured to reset and restart the ramp signal at the beginning of each switching cycle when operating the power converter in the buck-boost mode.

13. The control unit of claim 11, wherein a slope of the ramp signal is dependent on a pre-determined peak current through the energy conversion element.

14. A method for operating a power converter in a buck-boost mode; wherein the method comprises, within a switching cycle, operating the power converter in an IN state starting from a beginning of the switching cycle until a timer signal of a timer occurs; wherein in the IN state an input node of the power converter is coupled with a reference node of the power converter via an energy conversion element;

subsequently operating the power converter in a THROUGH state starting from the timer signal until a peak current event occurs; wherein in the THROUGH state the input node of the power converter is coupled with an output node of the power converter via the energy conversion element; and subsequently operating the power converter in an OUT state starting from the peak current event until a clock signal occurs, which indicates an end of the switching cycle; wherein in the OUT state the output node of the power converter is coupled with the reference node of the power converter via the energy conversion element, wherein:

the THROUGH state has a state duration which corresponds to a time interval that begins at the occurrence of the timer signal and that ends at the occurrence of the peak current event;

the OUT state has a state duration which corresponds to the time interval that begins at the occurrence of the peak current event and that ends at the occurrence of the clock signal which indicates the end of the switching cycle; and the IN state has a state duration which corresponds to a fixed timer duration of the timer minus the state duration of the OUT state.

15. The method of claim 14, comprising starting the timer for generating the timer signal upon occurrence of the peak current event.

16. The method of claim 15, further comprising:

determining whether or not the timer signal occurs prior to the clock signal;

operating the power converter in the buck-boost mode within a subsequent switching cycle, if the timer signal does not occur prior to the clock signal; and operating the power converter in a buck mode within the subsequent switching cycle, if the timer signal occurs prior to the clock signal.

17. The method of claim 16, further comprising, for operating the power converter in the buck mode within the subsequent switching cycle, operating the power converter in the THROUGH state starting from the beginning of the subsequent switching cycle until a peak current event occurs; and subsequently operating the power converter in the OUT state starting from the peak current event until a clock signal occurs, which indicates the end of the subsequent switching cycle.

18. The method of claim 17, further comprising, when operating the power converter in the buck mode, starting the timer for generating the timer signal upon occurrence of a peak current event within a given switching cycle; and determining whether or not the timer signal occurs prior to the clock signal which terminates the given switching cycle, in order to determine whether the power converter remains within the buck mode or transitions back to the buck-boost mode.

19. The method of claim 14, further comprising:

determining whether or not the peak current event occurs prior to the clock signal;

operating the power converter in the buck-boost mode within a subsequent switching cycle, if the peak current event occurs prior to the clock signal; and operating the power converter in a boost mode within the subsequent switching cycle, if the peak current event does not occur prior to the clock signal.

* * * * *